United States Patent [19]

Briesacher et al.

[11] Patent Number: 5,238,469
[45] Date of Patent: Aug. 24, 1993

[54] METHOD AND APPARATUS FOR REMOVING RESIDUAL HYDROGEN FROM A PURIFIED GAS

[75] Inventors: Jeffrey L. Briesacher, Pismo Beach; Charles H. Applegarth, San Luis Obispo; D'Arcy H. Lorimer, Pismo Beach, all of Calif.

[73] Assignee: SAES Pure Gas, Inc., San Luis Obispo, Calif.

[21] Appl. No.: 862,399

[22] Filed: Apr. 2, 1992

[51] Int. Cl.$^5$ .............................................. B01D 53/04
[52] U.S. Cl. ....................................... 95/115; 55/267; 165/171; 95/116; 96/108; 96/126
[58] Field of Search ............... 55/27, 28, 66, 68, 74, 55/76, 208, 267-269, 387; 165/171

[56] References Cited

U.S. PATENT DOCUMENTS

| | | | |
|---|---|---|---|
| 1,150,589 | 8/1915 | French | 55/27 X |
| 2,049,117 | 7/1936 | Hubert | 165/171 X |
| 2,558,345 | 6/1951 | Dickman | 165/171 X |
| 2,804,284 | 8/1957 | Otten | 165/171 X |
| 2,814,186 | 11/1957 | Kleist | 165/171 X |
| 3,173,481 | 3/1965 | Barkley | 165/171 X |
| 3,203,901 | 8/1965 | Della Porta | 252/131.6 |
| 3,217,796 | 11/1965 | Eklund et al. | 165/171 X |
| 3,535,074 | 10/1970 | Nakashima | 55/66 X |
| 3,620,645 | 11/1971 | Della Porta | 417/48 |
| 3,652,317 | 3/1972 | Della Porta | 117/22 |
| 3,766,660 | 10/1973 | Settlemyer | 55/74 X |
| 3,797,568 | 3/1974 | Kormann | 165/171 X |
| 3,926,832 | 12/1974 | Barosi | 252/181.6 |
| 3,961,897 | 6/1976 | Giorgi | 23/252 R |
| 4,060,070 | 11/1977 | Harter | 165/171 X |
| 4,071,335 | 1/1978 | Barosi | 55/68 |
| 4,146,497 | 3/1979 | Barosi | 252/181.6 |
| 4,269,624 | 5/1981 | Figini | 75/177 |
| 4,306,887 | 12/1981 | Barosi | 55/68 |
| 4,312,669 | 1/1982 | Boffito | 75/177 |
| 4,405,487 | 9/1983 | Harrah | 252/194 |
| 4,515,528 | 5/1985 | Young | 417/51 |
| 4,709,689 | 12/1987 | Simcox | 165/171 X |
| 4,907,948 | 3/1990 | Barosi | 417/53 |

FOREIGN PATENT DOCUMENTS

| | | | |
|---|---|---|---|
| 0365490 | 4/1990 | European Pat. Off. | |
| 51-028594 | 3/1976 | Japan | 55/66 |
| 60-030919 | 2/1985 | Japan | 165/171 |
| 2177079A | 1/1987 | United Kingdom | |
| 2177080A | 1/1987 | United Kingdom | |

OTHER PUBLICATIONS

Application of SAES and HWT gas purifiers for the removal of impurities from helium-hydrogen gas mixtures (Albrecht et al) J. Less-Common Met. 172-174:1157-1167 (1991).

Hydrogen isotope sorption and recovery by a non-evaporable getter combined with a chemical compressor material (Doni et al.) J. Vac. Sci. Technol. A. 4(6):2447-2451 (1986).

Removal of simple hydrocarbons from a rare gas by a 70%Zr-25%V-5%Fe getter (George et al) Gas Sep. & Purif. 3:50-55 (1989).

Primary Examiner—Robert Spitzer
Attorney, Agent, or Firm—Hickman & Beyer

[57] ABSTRACT

The invention relates generally to a gas purification system for the purification of noble gasses and nitrogen. An improved method of purification generally includes the following steps: (a) heating an impure gas; (b) contacting the impure gas with an impurity sorbing material to produce a purified gas; (c) cooling the purified gas to a temperature less than about 100° C.; and (d) contacting the purified gas with a hydrogen sorbing gas to remove residual hydrogen. The system includes an improved heat exchange apparatus for cooling the purified gas and a low temperature hydrogen sorption apparatus.

22 Claims, 4 Drawing Sheets

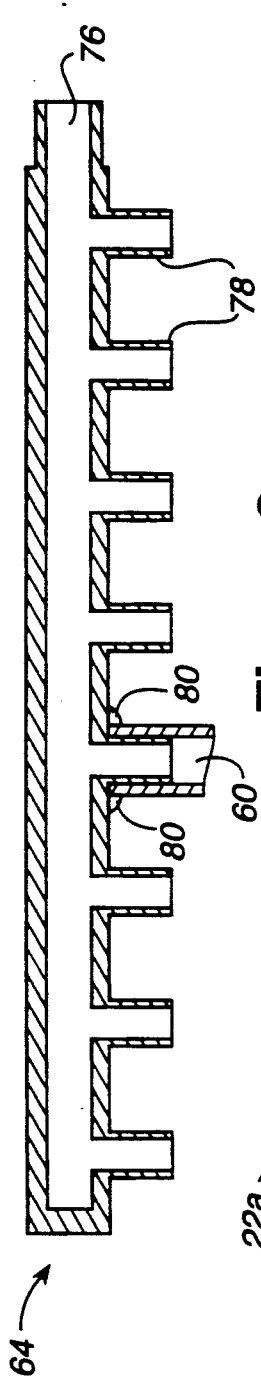
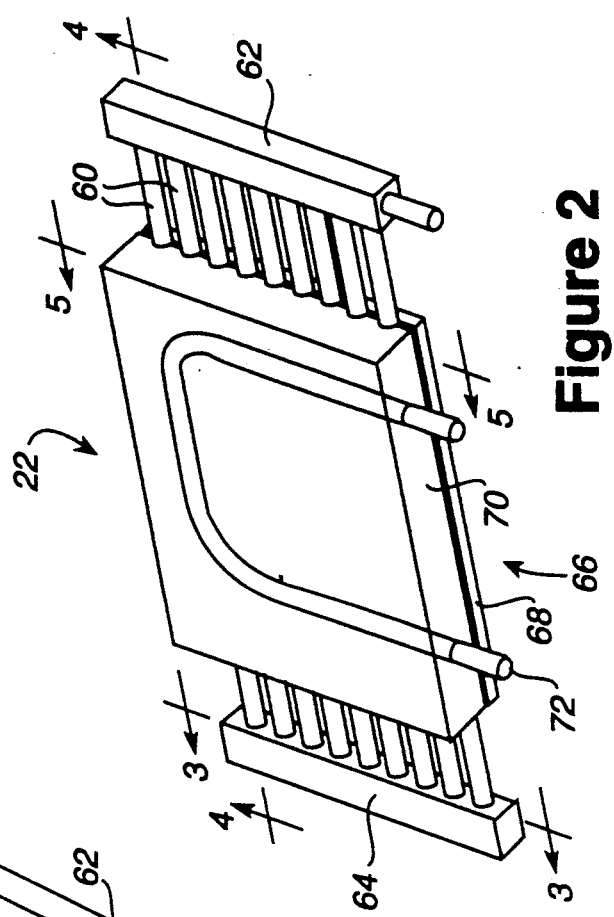
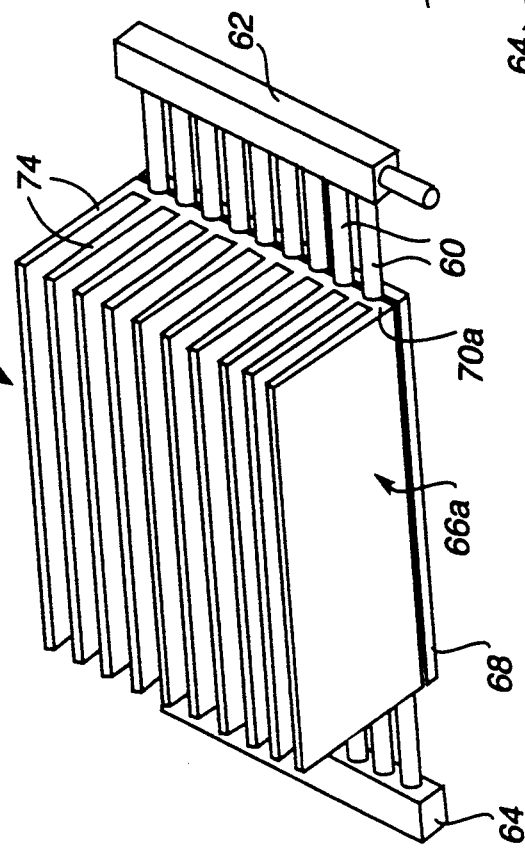

METHOD AND APPARATUS FOR REMOVING RESIDUAL HYDROGEN FROM A PURIFIED GAS

BACKGROUND OF THE INVENTION

This invention relates generally to gas purification, and more particularly to methods and apparatus for removing impurities from noble gasses, nitrogen, and other non-reactive gasses.

In the semiconductor manufacturing industry pure gasses are used in a variety of manufacturing processes, such as chemical vapor deposition (CVD), plasma etch, etc. The purity of the gas used in the manufacturing process becomes more critical as the feature width of integrated circuits decreases. For example, a decade ago feature widths in the range of 3 to 5 microns were standard. Currently, integrated circuits having feature widths of 0.5 to 0.7 microns are in production. With smaller feature widths, even a very low level of contaminants can damage an integrated circuit, thereby destroying its functionality or degrading its performance. Typical contemporary process specifications require process gasses to have less than 10 parts per billion (ppb) of contaminants, and preferably less than 1 ppb of contaminants.

One type of gas purifier utilizes hot getter materials for the removal of impurities from noble gasses and nitrogen. The getter materials are encased in stainless steel containers which are typically heated to a temperature in the range of 300° to 450° C. Unfortunately, stainless steel outgasses a significant amount of hydrogen at temperatures above approximately 200° C. In the past when process specifications allowed 100 ppb of hydrogen in a purified process gas this was not a major problem. However, with contemporary process specifications, the hydrogen outgassed from hot stainless steel surfaces has become a significant problem.

After a process gas passes through a getter-type gas purifier, it is cooled in a heat exchanger. Absent such cooling, the hot gas would pick up more hydrogen from the stainless steel tubing connecting the gas purifier to the semiconductor processing equipment and could also possibly damage valves and gas panels of the equipment. Prior art heat exchange units used in conjunction with semiconductor manufacturing equipment include a single heat exchange coil made from stainless steel tubing. Typically, the coil is immersed in a container through which a coolant liquid, such as water, is pumped.

An advantage of coiled heat exchangers is that they are relatively non-contaminating because the stainless steel coils have relatively few welds (e.g. typically only one at each end) which might leak or generate particles. Predictably, coiled heat exchangers also have some disadvantages. One of the main disadvantages of coiled heat exchangers is that the act of coiling the stainless steel tubing can compromise the electropolish finish on the interior surface of the tube, thereby increasing the amount of particulates produced by the tube itself. Another disadvantage of these prior art heat exchangers is that the long length of tubing can create a substantial back-pressure to the gas purifier unit.

Another type of heat exchanger, which is not known to have been used in the semiconductor processing industry with purified gasses, is the parallel tube heat exchanger. One type of parallel tube heat exchanger utilizes preformed T-connectors which are welded together to form inlet and outlet manifolds. A number of parallel, straight tubes are coupled between the two manifolds. Another type of parallel tube heat exchanger utilizes a pulled-T system. In such a system, holes are punched through from the inner surface of a manifold, and a short connecting nipple is welded to the manifold at each punched hole. Often, a reduction fitting is welded to each nipple to provide the appropriate diameter for the straight tubing. With the above-described types of parallel tube heat exchanger the number of welds are in the range of $4n+2$ to $6n+2$ to connect n tubes between two manifolds.

The large number of welds required of prior art parallel tube heat exchangers are more likely to be contaminating than the relatively few (typically two) welds required of coiled heat exchangers. Because of the contamination problems with parallel tube heat exchangers of the prior art, they have been thought to be poor choices for use with gas purification systems in the semiconductor manufacturing field.

Nonetheless, parallel tube heat exchangers have certain advantages over coiled tube heat exchangers. For one, parallel tube heat exchangers exhibit much less back-pressure for a given heat removal capacity than coiled tube heat exchangers. The parallel tube heat exchangers also tend to exhibit less of a temperature gradient along their relatively short lengths, thereby reducing the surface area of the tubes exhibiting temperatures greater than about 200° C. where hydrogen outgassing becomes significant.

SUMMARY OF THE INVENTION

A method for removing residual hydrogen from a purified gas in accordance with the present invention comprises the steps of: (a) heating an impure gas; (b) contacting the impure gas with an impurity sorbing material to produce a purified gas; (c) cooling the purified gas to a temperature less than about 100° C.; and (d) contacting the purified gas with a hydrogen sorbing material to remove residual hydrogen. Since hydrogen outgassing by hot stainless steel mostly occurs at temperatures greater than about 200° C., the removal of residual hydrogen at temperatures less than about 100° C. has been discovered to be surprisingly effective.

The apparatus of the present invention includes a heater assembly for heating an impure gas, a purifier assembly which purifies the heated gas, a heat exchange assembly which cools the purified gas, and a hydrogen sorbing assembly which removes residual hydrogen from the cooled, purified gas. The low temperature hydrogen sorbing unit effectively removes residual hydrogen without generating additional hydrogen due to the stainless steel outgassing phenomenon.

The heat exchange assembly is of a multiple, parallel, stainless-steel cooling tube design which minimizes contamination and maximizes heat dissipation. The heat exchange assembly is provided with a heat sink which maintains the cooling tubes at a relatively low and relatively constant temperature to minimize the generation of hydrogen by the aforementioned stainless steel outgassing phenomenon. Monoblock manifolds are used in the heat exchange assembly to minimize particulate and gas contamination.

These and other advantages of the present invention will become apparent to those skilled in the art upon a reading of the following specification of the invention and a study of the several figures of the drawing.

BRIEF DESCRIPTION OF THE DRAWINGS

FIG. 2 is a perspective view of a heat exchange assembly in accordance with the present invention;

FIG. 2a is a perspective view of an alternate embodiment for a heat exchange assembly in accordance with the present invention;

FIG. 3 is a cross-sectional view taken along line 3—3 of FIG. 2;

DETAILED DESCRIPTION OF THE PREFERRED EMBODIMENTS

Figure 1:
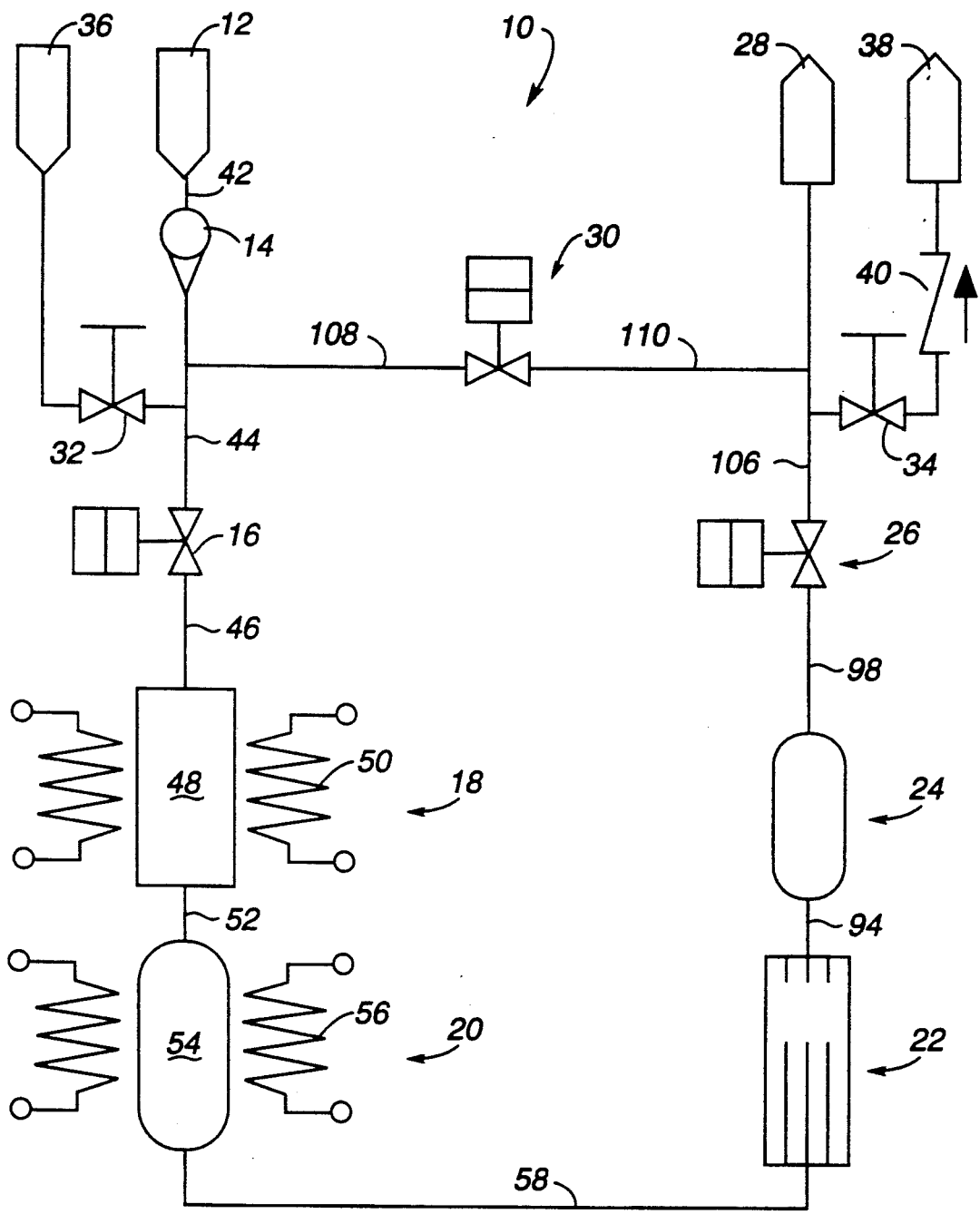
FIG. 1 is a schematic of a gas purification system in accordance with the present invention.

As illustrated in FIG. 1, a gas purification system 10 in accordance with the present invention includes an inlet 12, a mass flow meter 14, a solenoid activated valve 16, a heater assembly 18, a purifier assembly 20, a heat exchange assembly 22, a hydrogen sorbing assembly 24, a solenoid activated valve 26, and an outlet 28. The system 10 also includes a number of bypass valves 30, 32, and 34, an auxiliary inlet 36, an auxiliary outlet 38, and a check valve 40.

The interior surfaces of the gas purification system which may be contacted by a gas should be clean and well-polished. For example, the interior surfaces of all of the connecting tubing, the valves, and the various gas handling assemblies should be made of polished, non-reactive metal having a sufficiently close grain to minimize gas adsorption. The desirable degree of smoothness of the polished metal surface should be between 5 and 25 microinch Ra. Appropriate metals which can provide such surfaces include stainless steel and industry-standard alloys such as hastelloy, incoloy, and monel, which are available from a variety of sources. Such metals are typically electropolished to provide the proper surface specifications, as is well known to those skilled in the art.

A source of impure gas is coupled to gas inlet 12. By impure gas, it is meant that the gas typically includes impurities in the range of 0.1–10 parts per million (ppm). Therefore, these gasses actually quite pure for many applications, but may be considered impure for the ultra-clean processes required for semiconductor manufacturing. Examples of such impure gasses include nitrogen or one of the noble gasses as provided by commercial gas companies such as Air Products Corporation of Allenstown, Pa., Airco Corporation of Murry Hill, N.J., and Air Liquide of Chicago, Ill. Mass flow meter 14 is coupled to inlet 12 by a length of tubing 42 and is used to accurately monitor the amount of gas flowing through the system 10.

Valve 16 is coupled to mass flow meter 14 by a length of tubing 44 and is normally open during the operation of gas purification 10. The heater assembly 18 is coupled to the valve 16 by a length of tubing 46 and is operative to heat the gas prior to its introduction into the purifier assembly 20. The heater assembly includes a chamber 48, and an electric heater cartridge 50 coupled to an electrical power source (not shown) for heating the chamber 48. The temperature to which the gas is heated is generally greater than 200° C., and is preferably greater than 300° C., e.g. 300°–450° C. The operational efficiency of the preferred purifier assembly 20 is greatly enhanced by preheating the gas to these temperatures.

The purifier assembly 20 is coupled to the outlet of the heater assembly 18 by a length of tubing 52. The purifier assembly 20 includes a getter vessel 54 and an electric heater cartridge 56 coupled to the aforementioned electrical power source. The heater coil 56 is used to maintain the gas at a high operational temperature, i.e. greater than 200° C., and is preferably greater than 300° C. With some loss in efficiency, the heater assembly 18 can be eliminated and the gas can be heated to operational temperatures within the getter vessel 54 alone.

A getter vessel 54 preferably includes a generally cylindrical housing provided with welded gas-tight caps at both ends. One cap is provided with an inlet coupled to tubing 52, and the other cap is provided with an outlet coupled to a length of tubing 58. Within the getter vessel is a gas sorbing material (not shown) which is preferably a high-temperature getter material. As heated gas passes over the surface of the getter material impurities are removed from the gas as they are chemically sorbed into its surface. The gas released from the getter vessel 54 is therefore purified, and typically has less than 1–10 parts per billion (ppb) of contaminant gasses, other than residual hydrogen. Unfortunately, the hot stainless steel surfaces of the heater assembly 18, purifier assembly 20, and tubing 52 typically creates at least 10–25 ppb of hydrogen.

The non-evaporable getter materials useful in the present invention are characterized by a sorptive capacity for active gases. Examples of suitable metals for non-evaporable getters include, among others, zirconium, vanadium, iron. As disclosed in U.S. Pat. Nos. 3,203,901; 3,926,832; 4,071,335; 4,269,624; 4,306,887; 4,312,669; 4,405,487; and 4,907,948 (the disclosures of each of which is incorporated herein by reference) the manufacture and use of zirconium alloy getter materials are well known to those skilled in the art. The specific getter material used is chosen based upon the temperature range available, and upon the specific gas which is to be purified.

For example, if a noble gas is to be purified, the getter material can be an alloy of Zr—V—Fe. Such alloys generally have a weight composition such that the percentage of weight of the three elements when plotted on a ternary composition diagram lie with a polygon having as its corners defined by (a) 75% Zr—20% V—5% Fe; (b) 45% Zr—20% V—35% Fe; (c) 45% Zr—50% V—5% Fe. Such getter materials are described in U.S. Pat. No. 4,312,669. Preferably, a ternary alloy having a weight of Zr (70 wt. %)—V (24.6 wt. %)—Fe (5.4 wt. %) is used. Such alloys are available commercially in various forms as St707 Getter Alloy (SAES GETTERS S.p.A., Milan, Italy).

A suitable getter material for both noble gasses and nitrogen is an alloy of Zr—Fe. Such alloys are known to the art, and preferably consists of from 15 to 30% by weight of Fe, and from 70 to 85% by weight Zr (as described by U.S. Pat. No. 4,306,887). An especially preferred getter material is an alloy of 84 wt. % zirconium and 16 wt. % aluminum. Such alloys are available commercially in various forms as St101 Getter Alloy (SAES GETTERS S.p.A., Milan, Italy).

The physical embodiment of the getter material is not critical. A variety of getter material forms are known to the art or are commercially available. For example, the getter material can consist of a multiplicity of small pellets. Alternatively, the getter material may be provided in powdered form, or as a surface coating on a ceramic substrate.

Heat exchange assembly 22 is coupled to an outlet of getter vessel 54 by a length of tubing 58. The purpose of heat exchanger 22 is to cool the purified gas exiting the getter vessel to a temperature which is less than about 100° C. The construction and operation of the heat exchanger 22 will be discussed in greater detail with reference to FIGS. 2-5.

In FIG. 2, heat exchange assembly 22 includes a number of parallel, stainless-steel tubes 60 extending between an inlet manifold 62 and an outlet manifold 64. A heat sink assembly 66 is clamped around the tubes and comprises a first plate 68 and a second plate 70. The second plate 70 is provided with a conduit 72 through which a coolant fluid, such as water, can be circulated to remove heat from the heat sink assembly 66.

An alternate embodiment for a heat exchange assembly 22a is illustrated in FIG. 2a. This alternate embodiment also has a number of parallel tubes 60 extending between an inlet manifold 62 and an outlet manifold 64. However, the heat sink assembly 66a of the heat exchange assembly is air cooled rather than water cooled. The heat sink assembly 66a includes a first plate 68 similar in construction to the first plate 68 of heat exchange assembly 22, and also includes a second plate 70a and a number of fins 74 extending outwardly from the second plate 70a. A blower assembly (not shown) can be used in conjunction with the heat exchange assembly 22a to increase the rate of heat removal from the heat sink assembly 66a by moving air over the surface of fins 74.

FIG. 3 is a cross-sectional view of the outlet manifold 64 as taken along line 3—3 of FIG. 2. The inlet manifold 62 is of similar construction. The outlet manifold 64 is machined from a single piece of semiconductor grade stainless steel bar stock and, as such, is referred to herein as a "monoblock" manifold. The construction of the monoblock manifold is as follows. A section of semiconductor grade stainless steel rectangular bar stock is gun drilled to form a central bore 76. A number of nipples 78 corresponding to the number of cooling tubes 60 (nine in the present example) are then machined out of the bar stock. The interior surfaces of the manifold 64 are smoothed and then electropolished to minimize rough surfaces which might generate or accumulate potentially damaging particulates. Ends of cooling tubes 60 are placed over the nipples 78 and are securely welded to the manifold 62 by welds 80. The welds 80 should be gas-tight.

Figure 4:
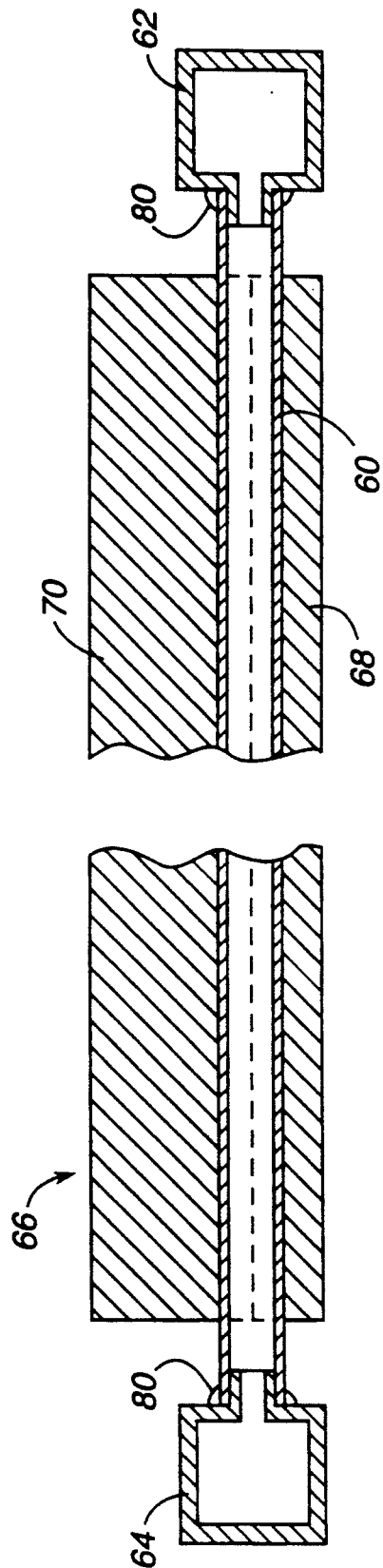
FIG. 4 is a cross-sectional view taken along line 4—4 of FIG. 2.
Figure 5:
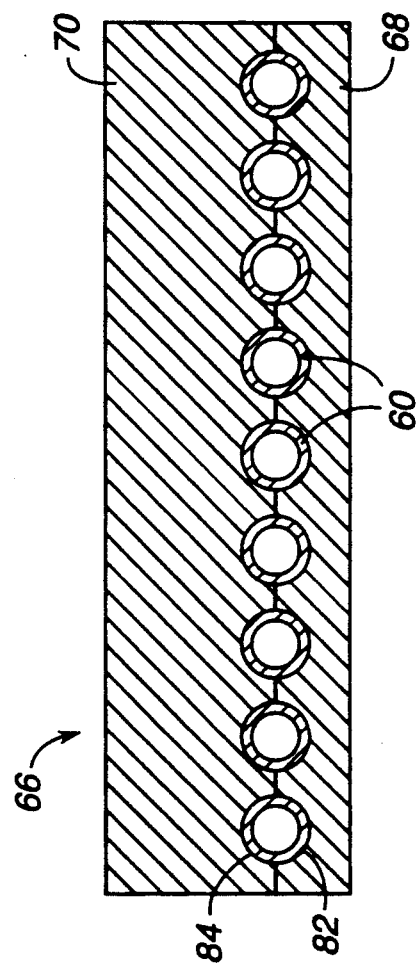
FIG. 5 is a cross-sectional view taken along line 5—5 of FIG. 2.

In FIG. 4, one of the cooling tubes 60 is shown extending between the inlet manifold 62 and the outlet manifold 64. The heat sink assembly 66 is located substantially centrally between the two manifolds. As mentioned previously, the heat sink assembly includes a first plate 68 which contacts a first side (i.e. 180° or ½ the external surfaces) of the tubes 60 and a second plate 70 which contacts a second side (i.e. the remainder of the external surfaces) of the tubes 60. As seen in the cross-section of FIG. 5, first plate 68 is provided with a number of machined grooves 82 receptive to the lower halves of the tubes 60 and second plate 70 is provided with a number of machined grooves 84 receptive to the upper halves of the tubes 60. This arrangement ensures good thermal conductivity between the cooling tubes 60 and the heat sink assembly 66. The heat sink assembly 66 is preferably made from a material having good heat capacity and thermal conductivity, such as aluminum or copper.

The heat exchange assembly 22 of the present invention has several important benefits. The multiplicity of cooling tubes 60 reduces the back pressure of the heat exchange assembly 22. Furthermore, the total length of the parallel tubes 60 is less than the total length of tubing in prior art single coiled tube systems for the same cooling capacity. By minimizing the interior surface area of the tubes 60 for a given cooling capacity, the potential for the production of hydrogen and water contamination by the heat exchange assembly 22 itself is reduced. Furthermore, the use of straight tubing 60 minimizes the production and accumulation of particulate contamination within the heat exchange assembly 22. The use of bent tubing is generally undesirable in high purity applications.

The heat sink assembly 66 also plays an important roll in reducing hydrogen contamination by the heat exchange assembly 22. The combination of large heat capacity and high thermal conductivity ensures that the tubing 60 which is in contact with the heat sink assembly 66 is at a relatively constant and relatively low temperature. For example, in the present embodiment the portions of tubes 60 which are in contact with heat sink assembly 66 have a substantially constant temperature of less than about 60° C. At this temperature, essentially no hydrogen is released from the interior walls of the tubes 60. In contrast, with prior art heat exchange units, there is a large temperature differential between the inlet side of the heat exchange tube and the outlet side of the heat exchange tube. Portions of the heat exchange tube which are above 200° C. will generate appreciable amounts of hydrogen.

Figure 6:
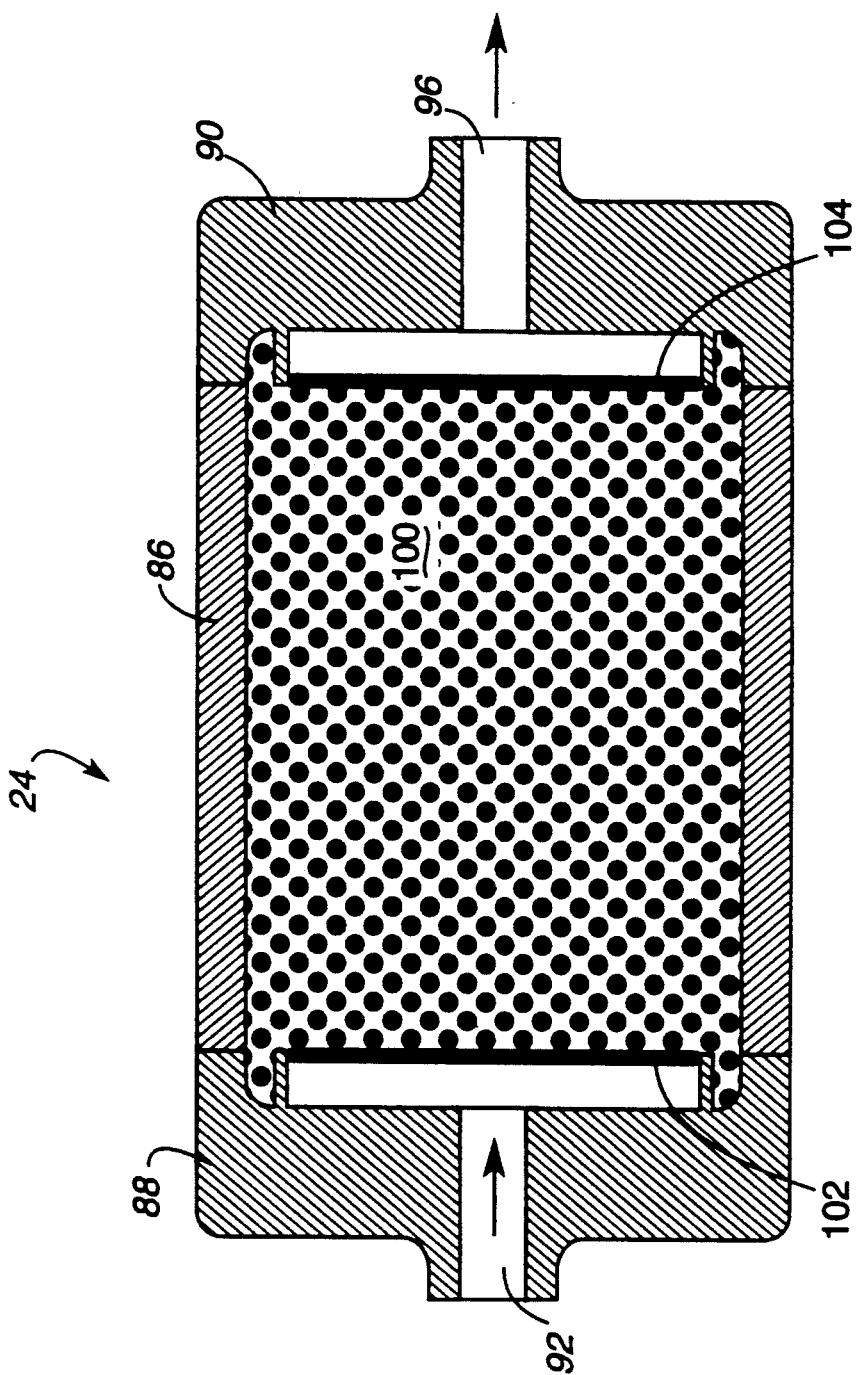
FIG. 6 is a cross-sectional view of a hydrogen sorbing assembly in accordance with the present invention.

FIG. 6 illustrates a hydrogen sorbing assembly 24 in accordance with the present invention. The assembly 24 includes a substantially cylindrical sheath 86 and a pair of end caps 88 and 90. The sheath 86 and end caps 88 and 90 are preferably made from an electropolished 316L stainless steel. End cap 88 is provided with an inlet 92 which is coupled to the outlet manifold 64 of the heat exchange assembly 22 by a length of tubing 94 (see FIG. 1). End cap 90 is provided with an outlet 96 which is coupled to a length of tubing 98 (see FIG. 1). Within the body of hydrogen sorbing assembly 24 is a hydrogen sorbing material 100, which will be discussed in greater detail subsequently. The hydrogen sorbing material 100 is packed into one or more chambers within the hydrogen sorbing assembly 24 and is held in place by a pair of stainless steel screens 102 and 104.

The hydrogen sorbing material 100 is characterized as being a non-evaporative getter which is effective to remove hydrogen at temperatures below about 100° C., more generally less than about 60° C. Preferably, the hydrogen sorbing material is used at temperatures ranging from ambient temperatures to about 40° C.

Hydrogen sorbing materials useful in the present invention are characterized by a sorptive capacity for hydrogen gas. Examples of suitable hydrogen getters include, among others, zirconium, titanium, hafnium, uranium, thorium, vanadium, tungsten, tantalum, niobium, and alloys of these metals. A preferred subclass of hydrogen getter materials useful in the present invention are the zirconium alloys.

For example, the getter material can be an alloy of Zr—V—Fe for for both noble gasses and nitrogen.

Such alloys generally have a weight composition such that the percentage of weight of the three elements when plotted on a ternary composition diagram lie with a polygon having as its corners defined by (a) 75% Zr—20% V—5% Fe; (b) 45% Zr—20% V—35% Fe; (c) 45% Zr—50% V—5% Fe. Such getter materials are described in U.S. Pat. No. 4,312,669. Preferably, a ternary alloy having a weight of Zr (70 wt. %)—V (24.6 wt. %)—Fe (5.4 wt. %) is used. Such alloys are available commercially in various forms as St707 Getter Alloy (SAES GETTERS S.p.A., Milan, Italy).

If the gas to be purified is a noble gas or nitrogen, the getter material can be an alloy of Zr—Fe. Such alloys are known to the art, and preferably consists of from 15 to 30% by weight of Fe, and from 70 to 85% by weight Zr (described by U.S. Pat. No. 4,306,887). An especially preferred getter material is an alloy of 84 wt. % zirconium and 16 wt. % aluminum. Such alloys are available commercially in various forms as St101 Getter Alloy (SAES GETTERS S.p.A., Milan, Italy).

In a preferred embodiment, the hydrogen getter is a ternary alloy having a weight of Zr (70 wt. %)—V (24.6 wt. %)—Fe (5.4 wt. %) is used. Such alloys are available commercially in various forms as St707 Getter Alloy (SAES GETTERS S.p.A., Milan, Italy). Once sorbed, oxygen, carbon and nitrogen atoms cannot be released again by this hydrogen getter material, even at its melting point (1400° C.±100° C.), due to the formation of strong chemical bonds with the alloy atoms. Hydrogen atoms, however, diffuse into the hydrogen sorbing material bulk more quickly than other atoms and distribute almost uniformly within the bulk. Due to well-known equilibrium phenomena, hydrogen sorption capacity of these materials actually increases with decreasing temperatures. However, because of the relatively weak forces which bind these atoms to the hydrogen sorbing material alloy, some of the hydrogen sorbed at a low temperature or at room temperature can be released at high temperatures. In other words, the hydrogen sorption is reversible and depends upon the hydrogen sorbing material temperature. This means that the hydrogen sorbing assembly 24 can be regenerated by heating the assembly above about 200° C. to drive off the hydrogen trapped in the hydrogen getter material. Hydrogen isotopes ($D_2$, $T_2$) are sorbed in the same way as normal hydrogen and present the same behavior.

Since the hydrogen sorbing assembly 24 and the gas flowing through it are at temperatures below about 100° C., the stainless steel of its construction produces almost no contaminating hydrogen. Nonetheless, residual hydrogen in the purified gas flowing through the hydrogen sorbing assembly 24 is effectively scavenged from the gas, because the hydrogen sorbing material 100 is effective even at room temperatures. The hydrogen sorbing assembly 24 of the present invention has been found to reduce hydrogen in purified nitrogen gas from 10–25 ppb to less than 1 ppb.

Referring again to FIG. 1, during normal operation valves 30, 32, and 34 are closed and valves 16 and 26 are open. Impure gas flows into inlet 12 and is pre-heated in heater assembly 18 before being purified in purifier assembly 20. The purified gas is then cooled in heat exchange assembly 22 and passed through hydrogen sorbing assembly 24 to remove residual hydrogen. The purified gas then flows through valve 26 and a length of tubing 106 and out outlet 28 for use in a manufacturing process.

Valve 30 can be used to bypass the active devices within the gas purification system. To accomplish the bypass, valves 16 and 26 are closed, and valve 30 is opened to permit gas flowing into inlet to flow through tubing 108, valve 30, tubing 110 and out of outlet 28. Since valves 16, 26, and 30 are all solenoid activated, this bypass function can be automatically initiated if the system senses a dangerous or sub-standard operating condition.

Manual valve 32 can be used to couple auxiliary inlet 36 to the tube 44. Manual valve 34 can be used to couple the tube 106 to auxiliary outlet 38 through a check valve 40. The check valve 40 is used to prevent potential contaminants from entering the system through the auxiliary outlet 38. The valves 32 and 34 are opened to permit the system 10 to be purged. For example, a gas source can be connected to inlet 36, valves 32, 16, 26 and 34 can be opened, and valve 30 can be closed to run a purging gas through the various sub-assemblies of the gas purification system 10.

To summarize, the method for removing residual hydrogen from a purified gas in accordance with the present invention includes the steps of: (a) heating an impure gas; (b) contacting the impure gas with an impurity sorbing material to produce a purified gas; (c) cooling the purified gas to a temperature less than about 100° C.; and (d) contacting the purified gas with a hydrogen sorbing gas to remove residual hydrogen.

While this invention has been described in terms of several preferred embodiments, it is contemplated that alterations, modifications and permutations thereof will become apparent to those skilled in the art upon a reading of the specification and study of the drawings. For example, heat exchange assembly 22 can be omitted if the pipe connecting the purifier assembly 20 to the hydrogen sorbing assembly 24 allows the gas to cool sufficiently due to ambient losses. In other words, the gas cooling means does not have to be a formal heat exchange unit but can be any type of connection or conduit which allows the gas to cool sufficiently for the hydrogen sorbing assembly 24.

It is therefore intended that the following appended claims include all such alterations, modifications and permutations as fall within the true spirit and scope of the present invention.

What is claimed is:

1. A method for removing residual hydrogen from a purified gas comprising the steps of:
   (a) heating an impure gas;
   (b) contacting the heated impure gas with an impurity sorbing material to produce a purified gas having trace amounts of residual hydrogen;
   (c) cooling the purified gas to a temperature less than about 100° C.; and
   (d) contacting the cooled purified gas with a hydrogen sorbing material to at least partially remove said residual hydrogen.

2. A method as recited in claim 1 wherein the impure gas is heated to more than about 200° C.

3. A method as recited in claim 2 wherein the purified gas is cooled to less than about 60° C.

4. A method as recited in claim 3 wherein the purified gas is cooled to less than about 40° C.

5. A method as recited in claim 1 wherein said impure gas includes at least a component which is selected from the group consisting essentially of nitrogen, helium, neon, argon, krypton, xenon, and radon.

6. A method as recited in claim 1 wherein said impurity sorbing material includes a non-evaporative getter material selected from the group consisting essentially of zirconium-vanadium-iron alloys and zirconium-iron alloys.

7. A method as recited in claim 1 wherein said hydrogen sorbing material includes a material selected from the group consisting essentially of zirconium, palladium, platinum, rhodium, ruthenium, nickel, titanium, and alloys thereof.

8. A method as recited in claim 7 wherein said hydrogen sorbing material includes a non-evaporative getter material selected from the group consisting essentially of zirconium-vanadium-iron alloys and zirconium-iron alloys.

9. A method as recited in claim 1 wherein said step of cooling said purified gas comprises flowing said purified gas through at least one conduit, wherein said conduit has a substantially constant wall temperature which is less than about 100° C.

10. A gas purification system comprising:
(a) gas inlet means for impure gas;
(b) heating means coupled to said gas inlet means for heating said impure gas to a temperature greater than about 200° C.;
(c) purifier means coupled to said heating means, said purifier means including a getter material capable of removing impurities from said impure gas to produce a purified gas;
(d) cooling means coupled to said purifier means for cooling said purified gas to a temperature less than about 100° C.;
(e) hydrogen sorbing means coupled to said cooling means which includes a hydrogen sorbing material to remove residual hydrogen from said purified gas; and
(f) a gas outlet for said purified gas.

11. A gas purification system as recited in claim 10 wherein said impure gas is heated to about 300°-450° C. by said heating means and said purified gas is cooled to less than about 60° C. by said cooling means.

12. A gas purification system as recited in claim 10 wherein said getter material comprises a non-evaporative getter alloy selected from the group consisting essentially of zirconium-vanadium-iron alloys and zirconium-iron alloys.

13. A gas purification system as recited in claim 10 wherein said hydrogen sorbing material is selected from the group consisting essentially of zirconium, palladium, platinum, rhodium, ruthenium, nickel, titanium, and alloys thereof.

14. A gas purification system as recited in claim 10 wherein said hydrogen sorbing material comprises a non-evaporative getter alloy selected from the group consisting essentially of zirconium-vanadium-iron alloys and zirconium-iron alloys.

15. A gas purification system as recited in claim 10 wherein said cooling means comprises:
(a) a first manifold, including a first plurality of integral connector nipples;
(b) a second manifold, including a second plurality of integral connector nipples aligned with said connector nipples of said first manifold;
(c) a plurality of straight tubes, each tube extending between a first connector nipple on said first manifold and a second connector nipple on said second manifold, each of said straight tubes being welded in place at the first manifold and at the second manifold.

16. A gas purification system as recited in claim 15 wherein said cooling means further comprises heat sink means contacting said plurality of straight tubes to maintain the temperature of said tubes at a substantially constant temperature along their lengths.

17. A gas purification system as recited in claim 16 wherein said heat sink means comprises a first plate contacting said plurality of tubes on a first side thereof and a second plate contacting said plurality of tubes on a second side thereof.

18. A gas purification system as recited in claim 16 further comprising means for removing heat energy from said heat sink means.

19. A heat exchange apparatus comprising:
(a) a first monoblock manifold formed from a single piece of material and including a first plurality of integral connector nipples such that interior surfaces of said first plurality of connector nipples do not include a joint between a plurality of pieces;
(b) a second monoblock manifold formed from a single piece of material and including a second plurality of integral connector nipples aligned with said connector nipples of said first manifold such that interior surfaces of said second plurality of connector nipples do not include a joint between a plurality of pieces;
(c) a plurality of straight tubes, each tube extending between a first connector nipple on said first manifold and a second connector nipple on said second manifold, each of said straight tubes being welded in place at the first manifold and at the second manifold.

20. A heat exchange apparatus as recited in claim 19 further comprising heat sink means contacting said plurality of straight tubes to maintain the temperature of said tubes at a substantially constant temperature along their lengths.

21. A gas purification system as recited in claim 20 wherein said heat sink means comprises a first plate contacting said plurality of tubes on a first side thereof and a second plate contacting said plurality of tubes on a second side thereof.

22. A gas purification system as recited in claim 21 further comprising means for removing heat energy at least one of said first plate and said second plate.

* * * * *